US010766213B2

(12) United States Patent
Kayashima

(10) Patent No.: US 10,766,213 B2
(45) Date of Patent: Sep. 8, 2020

(54) RUBBER COMPOSITION

(71) Applicant: BRIDGESTONE CORPORATION, Tokyo (JP)

(72) Inventor: Kentaro Kayashima, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 81 days.

(21) Appl. No.: 15/772,568

(22) PCT Filed: Nov. 28, 2016

(86) PCT No.: PCT/JP2016/085146
§ 371 (c)(1),
(2) Date: May 1, 2018

(87) PCT Pub. No.: WO2017/094653
PCT Pub. Date: Jun. 8, 2017

(65) Prior Publication Data
US 2019/0091951 A1 Mar. 28, 2019

(30) Foreign Application Priority Data
Nov. 30, 2015 (JP) .................. 2015-232711

(51) Int. Cl.
*C08L 23/16* (2006.01)
*C08K 3/22* (2006.01)
*C08K 5/40* (2006.01)
*C08K 5/01* (2006.01)
*B29C 73/16* (2006.01)
*C08L 23/28* (2006.01)
*B60C 19/12* (2006.01)

(52) U.S. Cl.
CPC ............ *B29C 73/163* (2013.01); *B29C 73/16* (2013.01); *B60C 19/12* (2013.01); *B60C 19/122* (2013.01); *C08K 3/22* (2013.01); *C08K 5/01* (2013.01); *C08K 5/40* (2013.01); *C08L 23/16* (2013.01); *C08L 23/28* (2013.01); *C08K 2003/2296* (2013.01)

(58) Field of Classification Search
CPC .... C08K 3/22; C08K 5/40; C08K 5/01; C08L 23/16
USPC ........................................................ 524/432
See application file for complete search history.

(56) References Cited

U.S. PATENT DOCUMENTS

| 4,591,617 | A | 5/1986 | Berta |
| 5,559,169 | A | 9/1996 | Belmont et al. |
| 5,684,077 | A | 11/1997 | Tracey et al. |
| 6,664,319 | B1 | 12/2003 | Bahl et al. |
| 6,753,374 | B1* | 6/2004 | Hannon ............... C08K 3/36 152/209.1 |
| 9,422,124 | B2 | 8/2016 | Tamura et al. |

| 2005/0080199 | A1* | 4/2005 | Kitahara ............... C08L 21/00 525/331.9 |
| 2006/0189755 | A1* | 8/2006 | Chino ..................... C08C 19/22 525/88 |
| 2009/0115108 | A1 | 5/2009 | Rodgers et al. |
| 2012/0065314 | A1 | 3/2012 | Lamkin et al. |
| 2013/0196085 | A1 | 8/2013 | Voge et al. |
| 2015/0017441 | A1 | 1/2015 | Yaguchi et al. |
| 2015/0024915 | A1 | 1/2015 | Tamura et al. |

FOREIGN PATENT DOCUMENTS

| CN | 101691067 A | 4/2010 |
| EP | 1074583 A1 | 2/2001 |
| EP | 1116747 A1 | 7/2001 |
| JP | 06-506013 A | 7/1994 |
| JP | 8-245565 A | 9/1996 |
| JP | 09-132005 A | 5/1997 |
| JP | 10-510574 A | 10/1998 |
| JP | 2001-011263 A | 1/2001 |
| JP | 2002-517589 A | 6/2002 |
| JP | 2006-152110 A | 6/2006 |
| JP | 2009-269446 A | 11/2009 |
| JP | 2010-209197 A | 9/2010 |
| JP | 2013-518158 A | 5/2013 |
| JP | 2013-216753 A | 10/2013 |
| JP | 2015-20814 A | 2/2015 |
| TW | 336244 B | 7/1998 |

OTHER PUBLICATIONS

International Search Report of PCT/JP2016/085146 dated Dec. 20, 2016.
Office Action dated Dec. 3, 2019 in Japanese Application No. 2015-232711.
Examination on a vulcanised system not containing Honda, Thiurams (TMTD), and 3 New Chemical Industry Co., Ltd. (Chinese Rubber Research Institute), GR006, 2004, vol. 14, No. 17, pp. 1-8; http://www.sanshin-ci.co.jp/data/334.html (9 pages total).
Aoyama, "N-nitrosamine (TRGS 552)", Journal of Japan Society of Rubber, 2010, vol. 83, No. 8, pp. 243-246 (4 pages total).
Vulcanization accelerator Sanceler TBzTD (Tetrabenzylthiuram disulfide), 2013, CAS registry No. 10591-85-2, Listed on TSCA Inventory (1 page total).
Sanshin Chemical Industry Co., Ltd., "Vulcanization accelerators", 2012, http://www.sanshin-ci.co.jp:80/products-cat/vulcanizationaccelerators (2 pages total).

(Continued)

*Primary Examiner* — Deve V Hall
(74) *Attorney, Agent, or Firm* — Sughrue Mion, PLLC

(57) ABSTRACT

Provided is a rubber composition for a sealant which can be vulcanized at low temperature and is suitable in a retentivity, an adhering property, followability and a fluidity and which is excellent in a sealing property, wherein the rubber composition is prepared by blending 100 parts by mass of a rubber component containing butyl rubber and/or EPDM, 2 to 10 parts by mass of zinc oxide, 1 to 5 parts by mass of a thiuram vulcanization accelerator, satisfying the thiuram vulcanization accelerator: the zinc oxide=1:1 to 1:3, and 150 parts by mass or more of liquid polybutene or a process oil.

17 Claims, No Drawings

(56) References Cited

OTHER PUBLICATIONS

Extended European Search Report dated Aug. 6, 2018 in EP 16870590.3.
Search Report dated Apr. 2, 2020, from the China National Intellectual Property Administration in Application No. 201680069517.3.

* cited by examiner ered more in performances as automobiles are increased in a driving speed. On the other hand, spare tires are desired to be unnecessary because of a reduction in a weight required to automobiles. Required are tires on which automobiles can continue to drive and move at least to a place making it possible to treat safely the tires even when the tires are punctured. Such the tires as described above make it possible to inhibit an inner pressure from being reduced and continuously drive and move without carrying out treatments such as prompt repair and exchange to a place where the tires can be treated safely even when the inner pressure is lowered to make the automobiles impossible to drive.

RUBBER COMPOSITION

CROSS REFERENCE TO RELATED APPLICATIONS

This application is a National Stage of International Application No. PCT/JP2016/085146 filed Nov. 28, 2016, claiming priority based on Japanese Patent Application No. 2015-232711 filed Nov. 30, 2015.

TECHNICAL FIELD

The present invention relates to a rubber composition for a sealant which is discharged temporarily from an inside in causing a puncture in a pneumatic tire to seal and protect the broken part.

BACKGROUND ART

In tires, gases such as air and nitrogen are usually charged therein in an inner pressure of about 250 to 350 kPa in terms of an absolute pressure to provide a skeleton part of the tire with a tension. The tension described above makes it possible to restore deformation caused by an applied force. However, if the tire is lacerated, the gas charged in the inside is leaked to the outside from the lacerated part to reduce the inner pressure of the tire down to an atmospheric pressure, and the tire is in a so-called punctured state.

In recent years, tires are requested to be enhanced more in performances as automobiles are increased in a driving speed. On the other hand, spare tires are desired to be unnecessary because of a reduction in a weight required to automobiles. Required are tires on which automobiles can continue to drive and move at least to a place making it possible to treat safely the tires even when the tires are punctured. Such the tires as described above make it possible to inhibit an inner pressure from being reduced and continuously drive and move without carrying out treatments such as prompt repair and exchange to a place where the tires can be treated safely even when the inner pressure is lowered to make the automobiles impossible to drive.

Tires in which a sealant material comprising a viscous rubber composition having a suitable fluidity is arranged in an inside are available as one of the tires described above. Applied is a technique in which when the tire is lacerated, the sealant material is inserted into the lacerated part by making use of an inner pressure of the tire to thereby seal the lacerated part and prevent the inner pressure from being reduced. In this connection, it depends on a retentivity and an adhering property of the sealant material whether or not the sealant material can function to seal the lacerated part.

When sharp foreign matters such as nails into a tire while driving, the sharp foreign matters stay in the tire in a certain case in a state in which foreign matters go through the tire without necessarily getting away soon. In the state described above, an inner pressure in the tire is not lowered immediately. Then, such a force as rubbing the foreign matters which stick into the tire is applied in the inside of the tire while driving. Accordingly, the foreign matters are rubbed against the tire on a contact face, and the contact face is abraded to some extent, whereby a gap is formed on the contact face. When the foreign matters are suddenly separated, the inner pressure is lowered, and the car cannot be driven in certain cases. In such the case, it depends on followability and a fluidity of the sealant material whether or not the lacerated part can be sealed by the sealant material.

Accordingly, first of all, the sealant material requires a suitable fluidity. The sealant material is characterized by containing a large amount of a plasticizer such as oils in the composition as compared with ordinary rubber compositions. In addition to requiring a large amount of a plasticizer, the rubber composition has to be adjusted in a balance with other blend components. Also, in addition thereto, a step different from that for conventional rubber compositions is required in a production step.

In particular, a rubber composition for a sealant material is characterized by containing a large amount of a plasticizer. When such the rubber composition as containing a large amount of a plasticizer is kneaded while heating for a long time, the plasticizer is volatilized to cause a loss. Produced is a vicious circle in which the plasticizer has to be further added in order to supplement the loss of the plasticizer. Also, as a matter of course, the problems of a deterioration in the working environment and a load applied onto the natural environment are involved therein.

It can be found in many cases that materials which are not subjected to cross-linking by sulfur are used in a composition unlike ordinary rubber compositions for tires. Used are materials showing a viscosity rather than such elastic to flexible rubber compositions which are rigidly cross-linked as used for ordinary tires. Accordingly, the rubber composition is turned into a sealant provided with a suitable viscosity by depolymerization by peroxide by heating at the same time in vulcanizing a peripheral rubber member rather than cross-linking to provide the rubber composition with a high molecular weight as is the case with patent document 1.

CONVENTIONAL ART DOCUMENT

Patent Document

Patent document 1: Japanese Patent Application Laid-Open No. 2006-152110

DISCLOSURE OF THE INVENTION

A sealant material is required to have a suitable fluidity for a quick responsiveness in puncturing, and on the other hand, the sealant material is requested as well to be provided with a retentivity in a lacerated part in order to seal a laceration. A composition in which a fluidity can be compatible with a retentivity is desired.

Paying attentions particularly on the effect of zinc oxide in blending components and carrying out examination therefor by the present inventors have resulted in coming to find a blend of a rubber composition which is suited to a sealant material and excellent in a fluidity and a sealing property toward lacerations.

That is, the present invention resides in the following items (1) to (9).
(1) A rubber composition prepared by blending:
100 parts by mass of a rubber component containing butyl rubber and/or EPDM,
2 to 10 parts by mass of zinc oxide,
1 to 5 parts by mass of a thiuram vulcanization accelerator, satisfying the thiuram vulcanization accelerator:the zinc oxide=1:1 to 1:3, and
150 parts by mass or more of liquid polybutene or a process oil.
(2) The rubber composition as described in the above item (1), obtained by dynamic cross-linking during kneading.

(3) The rubber composition as described in the above item (1) or (2), obtained by carrying out kneading at 140° C. or lower.

(4) The rubber composition as described in any one of the above items (1) to (3), containing halogenated butyl rubber as the butyl rubber.

(5) The rubber composition as described in any one of the above items (1) to (4), wherein 4 parts by mass or less of the thiuram vulcanization accelerator is blended.

(6) The rubber composition as described in any one of the above items (1) to (5), wherein 5 parts by mass or less of zinc oxide is blended.

(7) The rubber composition as described in any one of the above items (1) to (6), wherein the thiuram vulcanization accelerator is tetrabenzyl thiuram disulfide.

(8) A sealant material prepared by using the rubber composition as described in any one of the above items (1) to (7)

(9) A pneumatic tire prepared by using the sealant material as described in the above item (8).

According to the present invention, a rubber composition which is excellent in a fluidity and a sealing property for lacerations is obtained.

MODE FOR CARRYING OUT THE INVENTION

The rubber composition of the present invention is characterized by blending 100 parts by mass of a rubber component containing butyl rubber and/or EPDM, 2 to 10 parts by mass of zinc oxide, 1 to 5 parts by mass of a thiuram vulcanization accelerator satisfying the thiuram vulcanization accelerator:zinc oxide=1:1 to 1:3, and 150 parts by mass or more of liquid polybutene or a process oil.

The rubber composition of the present invention is characterized by containing butyl rubber and/or EPDM, that is, an ethylene-propylene-diene rubber as a main rubber component.

The butyl rubber abbreviated to IIR is, as known well, a rubber obtained by copolymerizing isobutylene with a small amount of isoprene at a low temperature of −100° C. or lower. Isoprene is copolymerized, but isoprene is contained in a small amount, and therefore the butyl rubber has a low unsaturation degree. Accordingly, the butyl rubber has less unsaturated bonds which are footholds for cross-linking, but the butyl rubber can be subjected to sulfur cross-linking itself. The butyl rubber with which 0.6 to 2.5% of isoprene is copolymerized can be used in the present invention, and that with which 1.6 to 2.2% of isoprene is copolymerized is preferred.

Chlorinated butyl rubber and brominated butyl rubber which are halogenated in several % are available for improving a compatibility with the rubber component, such as a sulfur cross-linking property and the like, and they are abbreviated respectively to CIIR and BIIR. In the present invention, the halogenated butyl rubber is preferably used as the butyl rubber. CIIR having a chlorination rate of 1.1 to 2.4%, preferably 1.15 to 1.5% is used, and BIIR having a bromination rate of 1.3 to 2.5%, preferably 1.7 to 2.2% is used.

EPDM which is the other main rubber component, that is, ethylene-propylene-diene rubber is also a rubber component having a low unsaturation degree, and the unsaturated bond is brought by dienes called as a third component and are copolymerized in a small amount and makes it possible to carry out sulfur cross-linking. Non-conjugated dienes such as dicyclopentadiene, ethylidenorbornadiene and 1,4-hexadiiene are used as the dienes. In particular, the rubber component with which ethylidenorbornadiene is copolymerized in 6 to 12%, preferably 7 to 11% can be used.

The butyl rubber and/or EPDM are blended respectively in a range of 20 to 80 parts by mass, preferably 30 to 80 parts by mass and particularly preferably 30 to 70 parts by mass based on 100 parts by mass of the total rubber component. Further, the butyl rubber and/or EPDM are blended in total in a range of preferably 70 to 100 parts by mass, particularly preferably 80 to 100 parts by mass.

A rubber component selected from a natural rubber and a synthetic diene base rubber may be blended as the rubber component blended except for the butyl rubber and EPDM. The synthetic diene base rubber includes rubbers such as polyisoprene rubber: IR, cis-1,4-polybutadiene rubber: BR, styrene-butadiene rubber: SBR, acrylonitrile butadiene rubber: NBR, and chloroprene rubber: CR. The rubbers may be blended in a range of 0 to 30 parts by mass based on 100 parts by mass of the total rubber component.

Next, the rubber composition of the present invention comprises 2 to 10 parts by mass of zinc oxide and 1 to 5 parts by mass of the thiuram vulcanization accelerator and is characterized by blending zinc oxide and he thiuram vulcanization accelerator in a ratio of the thiuram vulcanization accelerator:zinc oxide=1:1 to 1:3. The thiuram vulcanization accelerator is blended in a range controlled to preferably 4 parts by mass or less, particularly preferably 2 parts by mass or less. Similarly, zinc oxide is blended in a range controlled to preferably 5 parts by mass or less, particularly preferably 3 parts by mass or less. The ratio of the thiuram vulcanization accelerator to zinc oxide is preferably 1:1 to 1:2.4, particularly preferably 1:1.6 to 1:2.4 in terms of the thiuram vulcanization accelerator:zinc oxide. More zinc oxide is blended in a certain case from a viewpoint different from the suitable ranges described above, and it may be blended up to 10 parts by mass at most. Also, more thiuram vulcanization accelerator is blended as well in a certain case following zinc oxide.

The thiuram vulcanization accelerator is a vulcanization accelerator which can be a sulfur source in itself, and therefore if only this vulcanization accelerator is blended, sulfur cross-linking takes place. The butyl rubber and/or EPDM having unsaturated bonds subjected to sulfur cross-linking even if unsaturated bonds are carried in a small amount are blended as a main component of the rubber component, and therefore the sulfur cross-linking itself assumes being used as a means for controlling the physical properties.

Also, zinc oxide is used in order to efficiently act the thiuram vulcanization accelerator, and in the present invention, more zinc oxide is blended with the thiuram vulcanization accelerator in a ratio of 1:1 to 1:3 as compared with that used for a usual activation purpose. Zinc oxide itself contributes to not only the activation but also controlling the physical properties, and zinc oxide does not act simply as an inorganic filler as is the case with carbon black and silica. In any case, the fluidity and the adhering property of the rubber composition of the present invention can be controlled as well by the blend amounts of the thiuram vulcanization accelerator and zinc oxide.

Also, the rubber composition of the present invention passes through a kneading step for a long time while blending a plasticizer, and the rubber composition stays in a condition on which a mechanical damage is applied repeatedly onto the polymer chain of the rubber component to cause breakage, so-called mastication. Zinc oxide has the advantage that a mastication preventing effect can be expected. In view of the mastication preventing effect, relatively more zinc oxide is blended in a certain case even if zinc oxide exceeds the suitable range described above.

Further, the rubber composition of the present invention is characterized by being blended with 150 parts by mass or more of the liquid polybutene or the process oil as the plasticizer. Depending on the plasticizer, the plasticizer is blended preferably in 500 parts by mass or less. The plasticizer having a dynamic viscosity of 1000 mm$^2$·s$^{-1}$ or less at 100° C. can be used, and the plasticizer has a dynamic viscosity of preferably 800 mm$^2$·s$^{-1}$ or less, particularly preferably 600 mm$^2$·s$^{-1}$ or less. If the plasticizer itself has a smaller dynamic viscosity, the plasticizer is used in a smaller blend amount, and if the plasticizer has a larger dynamic viscosity, the plasticizer is used in a larger blend amount. Also, selection of the liquid polybutene and the process oil contributes to the temperature characteristic of the rubber composition for a sealant in the present invention.

An amount of the plasticizer is related to a blend amount of the thiuram vulcanization accelerator, and if the plasticizer is used in a larger amount, a use amount of the thiuram vulcanization accelerator follows the plasticizer and is increased as well to some extent, but the thiuram vulcanization accelerator has to be blended to a suitably limited extent. The thiuram vulcanization accelerator and the plasticizer can be blended in the ratio of the thiuram vulcanization accelerator:the plasticizer=1:30 to 1:250, preferably 1:80 to 1:250 and particularly preferably 1:150 to 1:250.

Since the thiuram vulcanization accelerator is used, sulfur for cross-linking is supplied from the vulcanization accelerator itself to some extent, but sulfur may be blended, if necessary, in a range of 1 part by mass or less, preferably 0.8 part by mass or less and particularly preferably 0 part by mass. Sulfur is blended in a range of preferably 25% by mass or less, more preferably 15% by mass or less and particularly preferably 0% by mass as compared with a balance with the thiuram vulcanization accelerator.

Capable of being used as the thiuram vulcanization accelerator are vulcanization accelerators usually used, such as tetramethyl thiuram disulfide, tetraethyl thiuram disulfide, tetrabenzyl thiuram disulfide, tetra(2-ethylhexyl) thiuram disulfide, 1,6-bis(N,N'-dibenzylthiocarbamoyldithio)-hexane, and 1,6-bis{N,N'-di(2-ethylhexyl)thiocarbamoyldithio}-hexane. However, the compounds which are hard to generate volatile amines in decomposition to be turned into a source for generating carcinogenic nitrosamines are preferred from the viewpoint of a safety of a recent working environment. Accordingly, the thiuram vulcanization accelerator having substituents of 4 or more carbon atoms can particularly be selected. Among thiuram vulcanization accelerators, tetrabenzyl thiuram disulfide is most preferably used from the viewpoint of the effects of the present invention.

In addition to the thiuram vulcanization accelerators, at least one compound selected from the group consisting of 2-benzothiazylsulfenamides, thiazoles, guanidines, dithiocarbamates, xanthate esters and xanthate salts may be used in combination as the vulcanization accelerator. It is considered to be a solving means in the case of temperature and conditions which are hard to control by the thiuram vulcanization accelerator. However, the compound is not a supply source for sulfur, and therefore sulfur has to be blended even in a small amount.

In addition to the foregoing fundamental blend components in the present invention, components such as a reinforcing filler, stearic acid and an antioxidant which are blended usually with rubber compositions can be blended.

The rubber composition of the present invention is blended with a reinforcing filler, but severe requests are not made in terms of reinforcing mechanical properties as is the case with ordinary rubber compositions. If the rubber composition is too fluid in staying continuously in the inside of the tire and is present unevenly in the inside of the tire, the rubber composition is unsuitable, but it is not such a problem as intending to control fluidity by the reinforcing filler. Considering a condition on which the tire is exposed to considerably high temperature in the inside of the tire, the reinforcing filler contributes to, if anything, thermal properties of the rubber composition for a sealant according to the present invention, such as a heat generating property and a heat resistance.

When particularly carbon black is used as the reinforcing filler, at least one selected from carbon blacks such as FEF and HAF is preferably blended from the viewpoint described above, and HAF is particularly preferably used.

When the carbon black is used, the blend amount thereof is preferably 1 to 30 parts by mass, particularly preferably 5 to 10 parts by mass based on the rubber component.

The rubber composition of the present invention is further blended with a thermoplastic resin which is an adhesive for charging in the inside of the tire and holding in a sticking manner.

The thermoplastic resin includes, to be specific, rosin base resins such as gum rosin, tall oil rosin, wood rosin, hydrogenated rosin, disproportionated rosin, polymerized rosin, glycerin and/or pentaerythritol esters of modified rosins, terpene resins of an α-pinene, a β-pinene and a dipentene, terpene resins such as aromatic modified terpene resins, terpene phenol resins and hydrogenated terpene resins, aliphatic petroleum resins obtained by polymerization or copolymerization of $C_5$ fractions obtained by pyrolysis of naphtha, aromatic petroleum resins obtained by polymerizing or copolymerizing $C_9$ fractions obtained by pyrolysis of naphtha, copolymerized petroleum resins obtained by copolymerization of $C_5$ fractions and $C_9$ fractions each described above, a hydrogenated, and petroleum resins of alicyclic compound such as dicyclopentadiene, and petroleum resins such as styrene resins which are copolymers of styrene and substituted styrene with other monomers. Also, the selection of the thermoplastic resin contributes to the thermal properties of the rubber composition for a sealant according to the present invention.

The thermoplastic resin can be blended in a range of 5 to 100 parts by mass, particularly preferably 10 to 60 parts by mass based on 100 parts by mass of the rubber component.

The rubber composition of the present invention can be produced by kneading the respective components described above by means of, for example, a mixer such as a Banbury mixer and a kneader. Since a lot of the plasticizer is, as described above, contained in the blend composition, the plasticizer cannot be added in one lot in kneading and has to be kneaded while gradually adding and blended while adapting. Accordingly, the rubber composition of the present invention requires a kneading time of 1 to 7 hours, and in general, it takes preferably 2 to 5 hours to knead the composition. The kneading time of 1 hour or longer makes it possible to allow the blend components to adapt to each other, and on the other hand, the kneading time set to 7 hours or shorter makes it possible to secure the productivity in a range of a commercial economy in view of the occupation of the production facilities.

Vulcanization is allowed to proceed by heating in combination with heat generated by conversion of a mechanical energy applied to the rubber by kneading. However, the rubber composition can be preferably vulcanized and cross-linked at low temperature so that the plasticizer blended in a large amount as described above is not volatilized. The present invention is characterized by carrying out dynamic vulcanization while kneading the rubber composition at 110 to 140° C., preferably 120 to 135° C. by using the thiuram vulcanization accelerator which is advantageous for vulcanization at low temperature from the viewpoint described above. The temperature controlled to 110° C. or higher makes it possible to carry out the step within time in which the productivity can be secured. On the other hand, the temperature controlled to 140° C. or lower makes it possible to prevent the plasticizer from being volatilized and hence maintain the working environment and the natural environment in good conditions.

The sealant material prepared by the rubber composition obtained in the present invention can be arranged in the inside of the pneumatic tire. From the viewpoint of causing the sealant material to function most efficiently, the sealant material is stuck preferably on the cavity part brought into contact with a gas such as air and nitrogen charged in the inside of the tire by a method close to coating. As a matter of course, the tire is not reduced in an inner pressure due to the leakage of the gas as long as the lacerations of the tire do not reach the cavity part. Accordingly, it is reasonable to arrange the sealant material in the cavity part where the sealant material has to be functioned just when the laceration reaches there.

Though the sealant layer is stuck on the cavity part, equipments, jigs and tools may be brought into contact with the sealant material in the step of producing the tire or when mounting in a wheel, and it is inconvenient in a certain case since the sealant material is a material still showing a fluidity. Accordingly, a contact face thereof with a gas may be covered so that the sealant material is prevented from being brought into direct contact with equipments, jigs and tools. Also, the sealant material may be retained by impregnating the sealant material in a material having pores to such an extent that a suitable fluidity is not prevented. In any cases, when a laceration reaches up to the air-charged part, the sealant material has to be smoothly moved to the lacerated part by the leaked gas in an autonomous manner.

Treatments such as covering and impregnating may be carried out in a certain case in order to make the sealant material easy to be held. Particularly preferably, however, problems such as an unnecessary increase in a weight are not brought about without taking protection methods such as covering and impregnating if the sealant material can be arranged by sticking the sealant material directly thereon. In such case that particularly the vehicle is left still, that is, the vehicle stops without rotation of tires, the sealant material flows downward due to a gravity and is unpreferably concentrated on a lower part. The tire is hot particularly after driving, and it readily reaches about 40 to 50° C. and stays in a condition on which the fluidity is readily increased. On the other hand, the sealant material is not evenly distributed by rotation when the vehicle stops, and therefore a condition on which the sealant material is most easily deviated is satisfied. Even in such case, the rubber composition of the present invention does not unfavorably flow. Also, the rubber composition is excellent in stability in the period of the life of the tire for a long time. if an aging is observed, falls within a range of a balance with a change in the whole tire.

EXAMPLES

Next, the present invention shall be explained in further details with reference to examples and comparative examples, but the present invention shall not be restricted by examples.

The components were kneaded at 120 to 135° C. in blend contents shown in Table 1 by means of a kneader mixer to prepare the respective rubber compositions for sealants in Examples 1 to 4 and Comparative Examples 1 to 6. Numbers in upper stages of the table show mass parts of the components based on 100 parts by mass of the rubber component.

Dripping Amount in Standing Still:

Samples in the form of 20 mm length × 20 mm width × 4 mm thickness were pasted on a stainless plate, and the plate was allowed to stand at an angle of 80 degrees from a parallel surface in an oven of 100° C. The samples flowed, and the flow lengths thereof were measured, whereby a dripping amount in standing still was measured and shown by an index, wherein that in Comparative Example 2 was set to 100. The smaller the numerical value is, the smaller the dripping is, and the better the retentivity and the adhering property are.

High Temperature Air Leak Test:

The sealant material was formed in a thickness of 3.5 mm and pasted on the inner surface of a tire. A nail was stuck into the tire in a thermostatic oven set to 60° C. and then pulled out, and air leak was examined, whereby it was judged whether or not the air could be sealed.

TABLE 1

| | Example | | Comparative Example | | | | | | Example | |
| --- | --- | --- | --- | --- | --- | --- | --- | --- | --- | --- |
| | 1 | 2 | 1 | 2 | 3 | 4 | 5 | 6 | 3 | 4 |
| EPDM*[1] | 60 | 60 | 60 | 60 | 60 | 60 | 60 | 60 | 60 | 60 |
| Bromobutyl rubber*[2] | 40 | 40 | 40 | 40 | 40 | 40 | 40 | 40 | 40 | 40 |
| Carbon black*[3] | 10 | 10 | 10 | 10 | 10 | 10 | 10 | 10 | 10 | 10 |
| Liquid polybutene*[4] | | | | | | | | 100 | 300 | 400 |
| Process oil*[5] | 250 | 200 | 100 | 250 | 250 | 250 | 250 | | | |
| Tackifier*[6] | 20 | 20 | 20 | 20 | 20 | 20 | 20 | 20 | 20 | 20 |
| MBTS*[7] | | | | 0.5 | 1 | 1.5 | | | | |
| DPG*[8] | | | | 0.3 | 0.6 | 1.2 | | | | |
| BBS*[9] | | | | 0.5 | 1 | 2 | | | | |
| TBzTD*[10] | 1.1 | 1.1 | 1.1 | | | | | 0.5 | 4.2 | 4.2 | 4.2 |
| Zinc oxide | 2.1 | 2.1 | 2.1 | 2.5 | 5.0 | 10.0 | 1.1 | 8.4 | 8.4 | 8.4 |
| Stearic acid | 0.6 | 0.6 | 0.6 | 2.0 | 4.0 | 8.0 | 0.3 | 2.4 | 2.4 | 2.4 |
| Sulfur | 0.2 | 0.2 | 0.2 | 1.5 | 3.0 | 6.0 | 0.1 | 0.6 | 0.6 | 0.6 |

TABLE 1-continued

|  | Example | | Comparative Example | | | | | | Example | |
| --- | --- | --- | --- | --- | --- | --- | --- | --- | --- | --- |
|  | 1 | 2 | 1 | 2 | 3 | 4 | 5 | 6 | 3 | 4 |
| Flow at standing | 20 | 15 | 10 | 100 | 85 | 85 | 25 | 10 | 15 | 20 |
| Air leak at high temperature | A | A | B | C | C | C | C | B | A | A |

Air leak at high temperature
A: Success to seal,
B: Fail to seal by poor liquidity,
C: Fail to seal by blow out
*[1]Ethylene-propylene-diene rubber: EP35, manufactured by JSR Corporation
*[2]Bromobutyl rubber: Bromobutyl 2255, manufactured by JSR Corporation
*[3]Carbon black: N330
*[4]Liquid polybutene: Nisseki Polybutene HV300, manufactured by JXTG Nippon Oil & Energy Corporation
*[5]Process oil: Dina Process Oil NR26, manufactured by Idemitsu Kosan Co., Ltd.
*[6]Tackifier: Quintone A100, manufactured by Zeon Corporation
*[7]Vulcanization accelerator: 2-benzothiazolyl disulfide, NOCCELER DM-P, manufactured by Ouchi Shinko Industrial Co., Ltd.
*[8]Vulcanization accelerator: 1,3-diphenylguanidine, NOCCELER D, manufactured by Ouchi Shinko Industrial Co., Ltd.
*[9]Vulcanization accelerator: N-tert-butyl-2-benzothiazolylsulfenamide, NOCCELER NS-P, manufactured by Ouchi Shinko Industrial Co., Ltd.)
*[10]Vulcanization accelerator: tetrabenzyl thiuram disulfide: Sanceler TBZTD, manufactured by Sanshin Chemical Industry Co., Ltd.

In Comparative Example 1 in which the process oil was blended in a smaller amount as compared with Examples 1 and 2 in which the blend conditions of the present invention were satisfied, the fluidity was insufficiently low, and the air leak could not be sealed in the high temperature air leak test. In any of Comparative Examples 2 to 4 in which the accelerators of a thiazole type, a guanidine type and a sulfenamide type other than a thiuram type were used as the vulcanization accelerator, it was difficult to optimize the fluidity even by controlling the combination thereof and the blend amount of sulfur. As a result thereof, it resulted in an increase in dripping in standing still, impossibility to seal air leaking in the high temperature air leak test and blowing the sealant material. Even when the thiuram vulcanization accelerator was used as was the case with Comparative Example 5, the sealant material having a sufficiently high hardness was not obtained and increased in dripping in standing still if an amount of the thiuram vulcanization accelerator was small, and therefore the air leak did not come to be sealed in the high temperature air leak test. On the other hand, the rubber compositions for a sealant which were suited to the present invention could be obtained as was the case with Examples 3 and 4 even by blending the liquid polybutene in place of the process oil if the blend conditions were satisfied. On the other hand, in Comparative Example 6 in which the liquid polybutene was blended in a smaller amount, the fluidity was insufficiently low, and the air leak could not be sealed in the high temperature air leak test. It was shown that the rubber compositions prepared in the examples in which the blend conditions of the present invention were satisfied had a high sealing ability in the high temperature air leak test. The rubber compositions prepared in the examples in which the blend conditions of the present invention were of a preferable quality in terms of having a good leaving still stability and causing no deviation of the sealant material in the tire in leaving still.

INDUSTRIAL APPLICABILITY

A rubber composition for a sealant which is suitable in a retentivity, an adhering property, followability and a fluidity and which is excellent in a sealing property is obtained by making use of the present invention.

The invention claimed is:

1. A rubber composition prepared by blending:
   100 parts by mass of a rubber component consisting of butyl rubber;
   2 to 10 parts by mass of zinc oxide;
   1 to 5 parts by mass of a thiuram vulcanization accelerator, satisfying the thiuram vulcanization accelerator: the zinc oxide =1:1 to 1:3; and
   150 parts by mass or more of liquid polybutene or a process oil as a plasticizer, satisfying the thiuram vulcanization accelerator: the plasticizer =1:30 to 1:250,
   wherein the rubber component consists of bromobutyl rubber as the butyl rubber.

2. The rubber composition as described in claim 1, obtained by dynamic cross-linking during kneading.

3. The rubber composition as described in claim 1, obtained by carrying out kneading at 140° C. or lower.

4. The rubber composition as described in claim 1, wherein 4 parts by mass or less of the thiuram vulcanization accelerator is blended.

5. The rubber composition as described in claim 1, wherein 5 parts by mass or less of zinc oxide is blended.

6. The rubber composition as described in claim 1, wherein the thiuram vulcanization accelerator is tetrabenzyl thiuram disulfide.

7. A sealant material prepared by using the rubber composition as described in claim 1.

8. A pneumatic tire prepared by using the sealant material as described in claim 7.

9. The rubber composition as described in claim 2, obtained by carrying out kneading at 140° C. or lower.

10. The rubber composition as described in claim 2, wherein 4 parts by mass or less of the thiuram vulcanization accelerator is blended.

11. The rubber composition as described in claim 2, wherein 5 parts by mass or less of zinc oxide is blended.

12. The rubber composition as described in claim 2, wherein the thiuram vulcanization accelerator is tetrabenzyl thiuram disulfide.

13. The sealant material prepared by using the rubber composition as described in claim 2.

14. The rubber composition as described in claim 3, wherein 4 parts by mass or less of the thiuram vulcanization accelerator is blended.

15. The rubber composition as described in claim 3, wherein 5 parts by mass or less of zinc oxide is blended.

16. The rubber composition as described in claim 1, wherein 1 to 30 parts by mass of carbon black based on 100 part by mass of rubber component is blended as a reinforcing filler.

17. The rubber composition as described in claim 1, wherein an adhesive is blended.

* * * * *